3,100,719
ANTIFOULING PIGMENT

Edward J. Dunn, Jr., Port Washington, and Martin Kushner, Long Island City, N.Y., assignors to National Lead Company, New York, N.Y., a corporation of New Jersey
No Drawing. Filed June 30, 1961, Ser. No. 120,935
7 Claims. (Cl. 106—308)

This invention relates to a novel antifouling copper pigment.

Copper compounds, particularly cuprous compounds, have long been known as among the best antifouling pigments to protect structures in underwater environments from fouling with algae, barnacles and other marine growths, and, particularly in the case of wooden structures, against the ravages of teredos or shipworms, limnoria, martesia, sphaeroma, and the like. These pigments, however, and paints based upon them are quite expensive, and the protection of wooden structures such as boats, pilings and the like, by the use thereof is a costly proposition.

Although such pigments, to be fully effective, must be applied in relatively large amounts, as compared for example with decorative finishes, the entire amount of pigment is not effectively utilized because only the surface of the particle is capable of exerting antifouling activity.

An object of this invention therefore is to provide an improved antifouling pigment.

Another object of this invention is to provide an antifouling pigment wherein the toxic pigment component is more efficiently utilized, thereby reducing the amount of pigment needed for protection in a given application.

Other objects and advantages will become apparent from the following more complete description and claims.

Broadly, this invention contemplates a composite pigment particle comprising a silica core and a coating of copper oxide.

This invention also contemplates a paint composition comprising as pigment therefor, a silica cored-copper oxide particle. In addition, there is also contemplated a process for the manufacture of a silica cored-copper oxide particle.

The copper in the copper oxide may be cuprous or cupric, and the compounds may be hydrated or anhydrous. Cuprous compounds are preferred because of their higher toxicity and consequent antifouling effectiveness. Cupric compounds, however, are also useful antifouling materials. Typically, the pigments of this invention will have the copper primarily in the cuprous state.

The pigments of this invention may be made, for example, by forming an intimate mixture of silica with a copper salt of an acid which has a water-soluble alkali salt. Among the most convenient of such compounds and also among the least expensive is copper sulphate pentahydrate, $CuSO_4 \cdot 5H_2O$. Other copper compounds such as the chloride, nitrate, etc. may be used equally well. The silica may be introduced in finely divided form, or may be ground simultaneously with the mixing operation, by starting with unground silica and introducing the silica together with the copper compound into a ball mill and grinding them together in aqueous slurry. The latter procedure is preferred since the freshly-fractured surfaces of the silica appear to pick-up and retain the copper compound more adherently than the old surfaces of silica which was previously finely divided. To the silica-copper mixture is added a hydroxy acid such as citric acid, tartaric acid, lactic acid and the like or their alkali salts. It has been found that the presence of the hydroxy acid aids in the conversion of the copper from the cupric to the cuprous form in the presence of a caustic and reducing agent. This mixture is then transferred to a reaction tank and treated with a caustic such as sodium hydroxide, potassium hydroxide or the like, in amounts sufficient to react with the copper salt, and preferably in slight excess. Approximately enough caustic is added to give an alkaline pH preferably of 8 or higher and the mixture maintained at a temperature not exceeding 60° C. This is sufficient to condition the surface of the silica, thereby further assisting in the pick-up and retention of copper compounds. Additional caustic may be used if desired to give a pH of 11 or higher to the mixture but there is no particular advantage in so doing. The addition of the caustic causes the mass to thicken and it is usually necessary to add more water as needed to preserve a workable consistency. After the mixture containing the caustic has been thoroughly blended, preferably by agitating for a period of time, for example one hour, after the addition of the caustic, the slurry may be filtered and washed to remove as much of the alkali sulfate, or alkali salt corresponding to the copper compound originally employed, as practicable although such filtering and washing is not necessary. Dextrose, fructose, sucrose or similar sugars are used as the initial reducing agents of the copper hydroxide to cuprous oxide. The reduction is facilitated and reaction time decreased by the presence of an aluminum, iron or similar metal ring or sheet acting as a reducing agent. The reducing agents may be introduced simultaneously with or after the addition of the caustic and the slurry temperature maintained at about 60° C. to about 100° C., although higher temperatures may be employed. After reduction, the copper oxide coated silica is washed to remove the alkali salt and dried. When fully dried, the product should preferably be ground in a hammer mill or equivalent apparatus so as to disintegrate any agglomerates and stored or packaged under an inert atmosphere.

The drying of the copper oxide-silica mixture, should preferably be carried out at a relatively low temperature, e.g. 115 to 120° C. and preferably not above 200° C. Such treatment results in a product having a maximum cuprous ion content. Drying at higher temperatures, for example 300 to 400° C. is more effective in terms of speed and completeness of water removal, but results in destruction of the cuprous ion values, converting them to cupric ion, thus producing a pigment of reduced, although still useful, antifouling activity. The mechanism whereby the copper ion, which is initially entirely cupric, is converted in part to cuprous ion has not been fully established. However it has been observed that when the process is carried out as just described there is an appreciable quantity of cuprous ion produced. The state of reduction of the pigment may be further controlled by the introduction of reducing agents into the system, for example by heating and drying in a reducing atmosphere, or by introducing reducing agents such as iron and aluminum strips and heating while in the slurry. However, if this reaction is carried too far the reduction produces some metallic copper. It should also be noted that the effect of temperature on the state of oxidation is reversed at higher temperatures. Thus when the copper oxide coated silica is not merely dried but calcined at temperatures of 1000° C. or higher the cupric oxide dissociates liberating free oxygen and being converted in the process to cuprous oxide, $Cu_2O$. As has been mentioned above, calcination of the coated product is not necessary in order to ensure a permanently coated copper oxide silica cored product. It is believed that the permanent coating of the copper oxide on the silica core is formed when the newly fractured active silica particles are brought into contact with the copper while it is in the process of being reduced, but this invention is not to be construed as limited to this theory.

The ratio of copper compound to silica in the pigments of this invention may vary widely. In order to improve to any appreciable degree the efficiency of utilization of the antifouling pigment, however, it is necessary that at least about 25% by weight of the composition be silica. On the other hand when the composition is too high in silica and correspondingly deficient in copper compound, for example when the silica is present in amount higher than about 75% by weight, the large bulk of silica present tends to dilute the active ingredient, i.e., the copper compound, to such an extent that it actually interferes with its effectiveness. In general it is preferred to use compositions containing about 30 to 60% silica.

In order to further illustrate the nature of this invention and the manner of carrying out the same, the following examples are presented:

EXAMPLE I

A charge of 1000 grams of silica and 750 milliliters of water was added to a one gallon ball mill and ground for 18 hours. Cupric sulfate pentahydrate (5090 grams) was dissolved in 3.2 liters of water. The ground silica slurry was added to the cupric sulfate solution. 160 grams of citric acid was added to the reaction solution.

Technical grade sodium hydroxide (1625 grams) was dissolved in 1.5 liters of water. The sodium hydroxide solution was added dropwise to the cupric sulfate silica slurry, taking approximately 1 hour for the addition. The temperature was kept below 60° C. for this addition. The pH after the addition of the sodium hydroxide solution was 10.7. The reaction slurry was a blue-green color. Five liters of water was added to thin the batch.

Technical grade dextrose (110 grams) was dissolved in 1 liter of water at room temperature and added dropwise to the above reaction slurry over a period of 2 hours. The pH of the slurry after the dextrose addition was 8.0. Caustic was added to bring the pH up to 9.5. An aluminum sheet, 4″ x 12″ x 1/16″, was placed in the wooden reaction tank and the temperature raised to approximately 90° C. Cuprous oxide forms quickly under these conditions.

To make sure that copper is not lost in solution, 360 grams of caustic was dissolved in 1 liter of water and added dropwise to the reaction slurry in increments of about 200 ccs. When the supernatant liquor changes from blue to colorless after standing for 15 minutes, no further additions of caustic are necessary. The batch was washed by decantation, filtered and dried.

Properties

| | |
|---|---|
| Silica | percent 45 |
| $Cu_2O$ | do 55 |
| Specific gravity | 3.5 |
| Oil absorption | 14.5 |
| pH | 8.8 |

EXAMPLE II

A charge of 1386 grams of silica and 875 ccs. of water was added to a ball mill and ground for 18 hours. Cupric sulfate pentahydrate $CuSO_4 \cdot 5H_2O$ (3210 grams) was dissolved in 2 liters of water in the reaction tank. The ground silica slurry was added to the cupric sulfate solution. Citric acid (103 grams) was added directly to this slurry.

Sodium hydroxide (1024 grams) was dissolved in 1500 milliliters of water and added dropwise to the above slurry. The slurry was mixed during the addition of the sodium hydroxide, and it took approximately 2½ hours to add the sodium hydroxide solution in order to maintain the batch below 60° C. The final pH of the slurry should be approximately 11 when all the sodium hydroxide has been added.

Additional water (approximately 9 liters) was added to the batch to make the slurry thinner. Dextrose, technical grade (1615 grams), was dissolved in 1 liter of water and added dropwise to the batch to start the reduction to cuprous oxide. After the dextrose was added, additional caustic is added, if necessary, to bring the pH up in the range of 9.5.

An aluminum sheet, 4″ x 12″ x 1/16″, was placed in the wooden reaction tank and the temperature raised to 90° C. to complete the reaction to cuprous oxide.

To prevent any loss of copper in solution, additions of sodium hydroxide are made until the supernatant liquid changes from blue to colorless. 300 grams of sodium hydroxide dissolved in 500 milliliters of water is added dropwise in 100 milliliters increments and allowed to stand for 15 minutes to determine if the supernatant liquor will be colored. The batch was washed by decantation, filtered and dried giving a good adherent coating of cuprous oxide on the surfaces of the silica particles.

Properties

| | |
|---|---|
| $Cu_2O$ | percent 41 |
| Silica | do 59 |
| Specific gravity | 3.25 |
| Oil absorption | 17.1 |
| pH | 10 |

The antifouling properties of the pigments found in Examples I and II were determined by substituting each pigment on an equal volume basis in a standard multiple pigment antifouling paint. This standard paint contained pure cuprous oxide as a control. The paints were applied on 6″ x 12″—12 gauge sandblasted hot rolled steel panels using a coat of standard wash primer, two coats of Maritime Commissioner specification paint Number 52MA401 and a finish coat of test antifouling paint. The paints were applied at a dry film thickness per coat of .4 mil for the wash primer, 1.5 mils for the AC and 2 mils for the antifouling coat. Exposures were made at Sayville, New York, and at Daytona Beach, Florida. Table I denotes the paint compositions. The figures represent percent by weight. It should be noted that paints 1 and 2 contain approximately equal amounts of active antifouling pigment and paint 3 contains substantially less active material.

TABLE I
[Antifouling Paint Formulations]

| | Paint 1 | Paint 2 | Paint 3 |
|---|---|---|---|
| Percent pigment | 58.2 | 57.1 | 53.7 |
| Pigment composition: | | | |
|   Zinc oxide | 4.8 | | |
|   Red iron oxide | 19.2 | | |
|   Cuprous oxide | 48.0 | | |
|   Magnesium silicate | 27.0 | | |
|   Bentone 38 [1] (organophilic bentonite) | 1.0 | 1.2 | 1.3 |
|   Cuprous oxide coated silica, 55% CuO | | 98.8 | |
|   Cuprous oxide coated silica, 41% CuO | | | 98.7 |
| Percent vehicle | 41.8 | 42.9 | 46.3 |
| Vehicle composition: | | | |
|   Chlorinated biphenyl | 11.7 | 13.4 | 13.2 |
|   Water white rosin | 36.1 | 41.2 | 40.7 |
|   Pine oil | 2.9 | 3.4 | 3.3 |
|   Volatile petroleum solvent | 48.8 | 41.5 | 42.3 |
|   Methanol | 0.5 | 0.5 | 0.5 |

[1] Bentone 3S is an organophilic bentonite prepared by the reaction of bentonite with an aliphatic ammonium salt.

The fouling results in Florida waters showed that after only one month of exposure, paint 1 developed very severe fouling whereas paints 2 and 3 after 4 months of exposure were free of fouling. Exposure in New York waters for 6 months showed some barnacle growth when paint 1 was used, but paints 2 and 3 were free of barnacles. In addition, paints 2 and 3 were free of algae with only slight fouling due to sea squirts. The results demonstrate that when the active antifouling pigment is placed on a silica core, a greater efficiency of the pigment is realized.

The antifouling pigment contemplated by this invention may be included in the paint formulation wherein it comprises 100% of the pigment or, in combination with other pigments, such as coloring pigments, filler pigments, or other antifouling pigments where the antifouling pigment may comprise as little as 30% of the total pigment. As is obvious to those skilled in the art, the amount of antifouling pigment present in the paint formulation may vary over wide limits depending upon, for example, the vehicle composition and the resins and plasticizers used therein, and may therefore be left to the discretion of the paint formulator.

While this invention has been described with reference to certain specific embodiments and illustrated by way of specific examples, these are illustrative only and the invention is not to be construed as limited except as set forth in the following claims.

We claim:

1. A composite pigment particle consisting essentially of a silica core and a coating of copper oxide, said silica analytically present within the range of from 25% to 75%.

2. A composite pigment particle consisting essentially of a silica core and a coating of copper oxide, said silica analytically present within the range of from 30% to 60%.

3. A composite pigment particle consisting essentially of a silica core and a coating of a copper oxide said copper oxide being substantially cuprous oxide, said silica analytically present in the range of from 25% to 75%.

4. A paint composition comprising as pigment therefor, a silica cored-copper oxide particle.

5. A paint composition comprising as pigment therefor, a silica cored-copper oxide particle, said pigment comprising from about 30% to about 100% of the percent pigment contained in the paint composition.

6. A process for the manufacture of a silica cored-copper oxide particle which comprises the steps of (1) mixing in an aqueous medium, silica, a copper salt of an acid which has a water soluble alkali salt and a hydroxy aliphatic acid (2) treating this mixture with an alkali metal hydroxide in amounts sufficient to give the mixture a pH of at least 8, said mixture maintained at a temperature not exceeding 60° C. (3) adding a reducing agent (4) filtering and removing the alkali salt and (5) drying at a temperature not exceeding 200° C.

7. A process for the manufacture of a silica cored-copper oxide particle which comprises the steps of (1) mixing in an aqueous medium, silica, copper sulphate and citric acid and (2) treating this mixture with an alkali metal hydroxide in amounts sufficient to give the mixture a pH of at least 8, said mixture maintained at a temperature not exceeding 60° C. (3) adding a reducing sugar (4) filtering and removing the alkali salt and (5) drying at a temperature not exceeding 200° C.

References Cited in the file of this patent

UNITED STATES PATENTS

| | | |
|---|---|---|
| 2,847,475 | Voge et al. | Aug. 12, 1958 |
| 3,004,857 | Merson et al. | Oct. 17, 1961 |

OTHER REFERENCES

National Paint Dictionary, publ. 1948, 3rd ed., by Stewart Research Laboratory, Washington, D.C., (page 160).

Williams et al.: "A New Pigment Concept," Ind. & Eng. Chem.; Oct. 1948, vol. 40, No. 10, (pages 1948–50).